United States Patent

Mueller

Patent Number: 5,791,290
Date of Patent: Aug. 11, 1998

[54] LARVAL INCUBATOR FOR FISH LARVA CULTURE

[75] Inventor: Olivier Mueller, Suchy, Switzerland

[73] Assignee: Percitech S.A., Suchy, Switzerland

[21] Appl. No.: 545,837

[22] PCT Filed: Mar. 7, 1995

[86] PCT No.: PCT/CH95/00049

§ 371 Date: Nov. 7, 1995

§ 102(e) Date: Nov. 7, 1995

[87] PCT Pub. No.: WO95/24121

PCT Pub. Date: Sep. 14, 1995

[30] Foreign Application Priority Data

Mar. 9, 1994 [CH] Switzerland ............... 94/02905

[51] Int. Cl.⁶ ................................................ A01K 61/00
[52] U.S. Cl. ........................................ 119/218; 119/232
[58] Field of Search ........................ 119/217, 218, 119/226, 228, 232, 233, 236, 245, 253, 257, 263, 264, 269

[56] References Cited

U.S. PATENT DOCUMENTS

| | | | |
|---|---|---|---|
| 1,528,179 | 3/1925 | Baldridge | 119/232 |
| 3,155,609 | 11/1964 | Pampel | 119/217 |
| 3,661,119 | 5/1972 | Sanders | |
| 3,683,853 | 8/1972 | Lewis | 119/218 |
| 3,683,854 | 8/1972 | Lewis | 119/217 |
| 3,709,195 | 1/1973 | Tabb | 119/208 |
| 3,738,317 | 6/1973 | Reynolds | 119/218 |
| 3,886,905 | 6/1975 | McNeil | 119/218 |
| 3,981,273 | 9/1976 | Buss | 119/232 |
| 4,182,269 | 1/1980 | Young, II | 119/218 |
| 4,205,626 | 6/1980 | Muchmore et al. | 119/218 |
| 4,213,421 | 7/1980 | Droese et al. | 119/224 |
| 4,221,187 | 9/1980 | Casey | 119/232 |
| 4,738,220 | 4/1988 | Ewald, Jr. | 119/202 |
| 5,293,838 | 3/1994 | Jorgensen et al. | 119/218 |
| 5,293,839 | 3/1994 | Jorgensen | 119/232 |
| 5,297,513 | 3/1994 | Musgrave | 119/252 |

FOREIGN PATENT DOCUMENTS

| | | | |
|---|---|---|---|
| 1 911 283 | 10/1970 | Germany | |
| 0703074 | 12/1979 | U.S.S.R. | 119/218 |
| 0725633 | 4/1980 | U.S.S.R. | 119/218 |
| WO 88/00435 | 1/1988 | WIPO | |

Primary Examiner—John G. Weiss
Assistant Examiner—Francis K. Cuddihy
Attorney, Agent, or Firm—Davis and Bujold

[57] ABSTRACT

An incubator (10) comprising a cylindrical tank (11) with a bottom wall (12) and a side wall (13). The tank is provided with a clean or regenerated water supply system (17), a waste water discharge system (18), a device (19) for altering the gas level to avoid supersaturation of gas in the water, a larva feed dispenser (20) and a device (21) for skimming the water surface. The tank further includes a member (22) arranged at the bottom of the tank for generating water currents therein, and a strainer (23) for preventing the larvae from entering the discharge system (18). The current generating member (22) comprises blades located beneath the supply system (17).

13 Claims, 3 Drawing Sheets

LARVAL INCUBATOR FOR FISH LARVA CULTURE

The present invention concerns a larval incubator for fish larva culture, comprising a cylindrical water tank with a distribution device, a feed dispenser, a device for altering the gas level in the water, a device for skimming the water surface, a means for supplying clean or regenerated water, and a means for evacuating waste water.

Incubation tanks known in the art generally comprise a clean water supply on the outer edge, near the free surface of the water, and an overflow device for regulating water level in the tank. Certain models also have a skimming device for removing film, which contains lipids and bacteria, from the water surface. A gas removal device can be added to the tank to prevent the water from becoming supersaturated with gas. Theoretically, all tanks also have a feed dispenser. The feed it distributes falls into the tank and the larvae consume part of it, while the rest remains on the bottom of the tank. Such a device has two flaws. First, the larvae closest to the food supply grow more quickly, to the detriment of the others, and thus the resulting batch contains larvae of mixed sizes; secondly, the food that falls to the bottom of the tank is wasted and decomposes, contaminating the water.

Most tanks presently used have opaque black walls. This enables the larva to locate their food supply readily because the contrast makes the food easily distinguishable. However, during the first few days of life, certain fish larvae such as perch (*Perca fluviatilis*), turbot (*Scophthalmus inacimus*), and Sparidae (*Sparus aurata*) shun high intensity light; if placed in an incubator with dark, opaque walls, they swim nervously into the walls to avoid the light coming from the upper part of the tank. Therefore, an ideal incubation tank would have transparent walls during the early larval incubation stage and dark, opaque walls once the larvae outgrow the disorganized swimming pattern.

Each accessory must be independently adapted and attached to tanks presently in use. Moreover, the disadvantages described above provide less than ideal conditions for a fish larva culture and have a low success rate.

The present invention eliminates these problems by proposing a simply designed tank with detachable, easily removed accessories, which does not waste food and maintains constant water quality.

This object is achieved by the larval incubator described in the preamble, characterized in that the means for supplying clean or regenerated water to the tank consists of a duct which is located generally along the vertical axis of the tank, which has at least one outlet at its base and which is associated with a means for generating radial, ascending currents in the water in the tank.

According to a preferred embodiment, the means for generating currents in the water comprises blades at the bottom of the tank around a circular crown of adjustable height.

According to one advantageous embodiment, said duct comprises at least one inlet tube for clean or regenerated water, which is connected at one end to a water supply and at the other end to one of the outlets, said tube emptying near the bottom of the tank above the blades in the space defined by the circular crown.

The inlet tube preferably has a detachable nozzle which is equipped with the outlet.

The means for evacuating waste water advantageously consists of an evacuation tube, one end of which is located at the level of the free surface of the water and the other end of which passes through the bottom of the tank and empties outside the tank.

The evacuation tube is advantageously screwed into the bottom of the tank.

The duct advantageously comprises several water inlet tubes arranged around the evacuation tube and connected to it.

According to a preferred embodiment, the water supply and evacuation tubes, the device for generating currents in the water, the gas level modifying device, the skimmer and the feed distribution device are all interconnected and form a detachable unit.

According to a preferred embodiment, a strainer encases the supply tube and the evacuation tube, and the top of the strainer extends above the water level.

According to a preferred embodiment, the tank has at least one transparent lateral wall and a dark, opaque, convex bottom.

According to a preferred embodiment, the upper rim of the tank has means for attaching a dark, opaque cover which is removable.

The advantages of the present invention will be more apparent from the following description of one embodiment with reference to the attached drawings, wherein.

Figure 1:
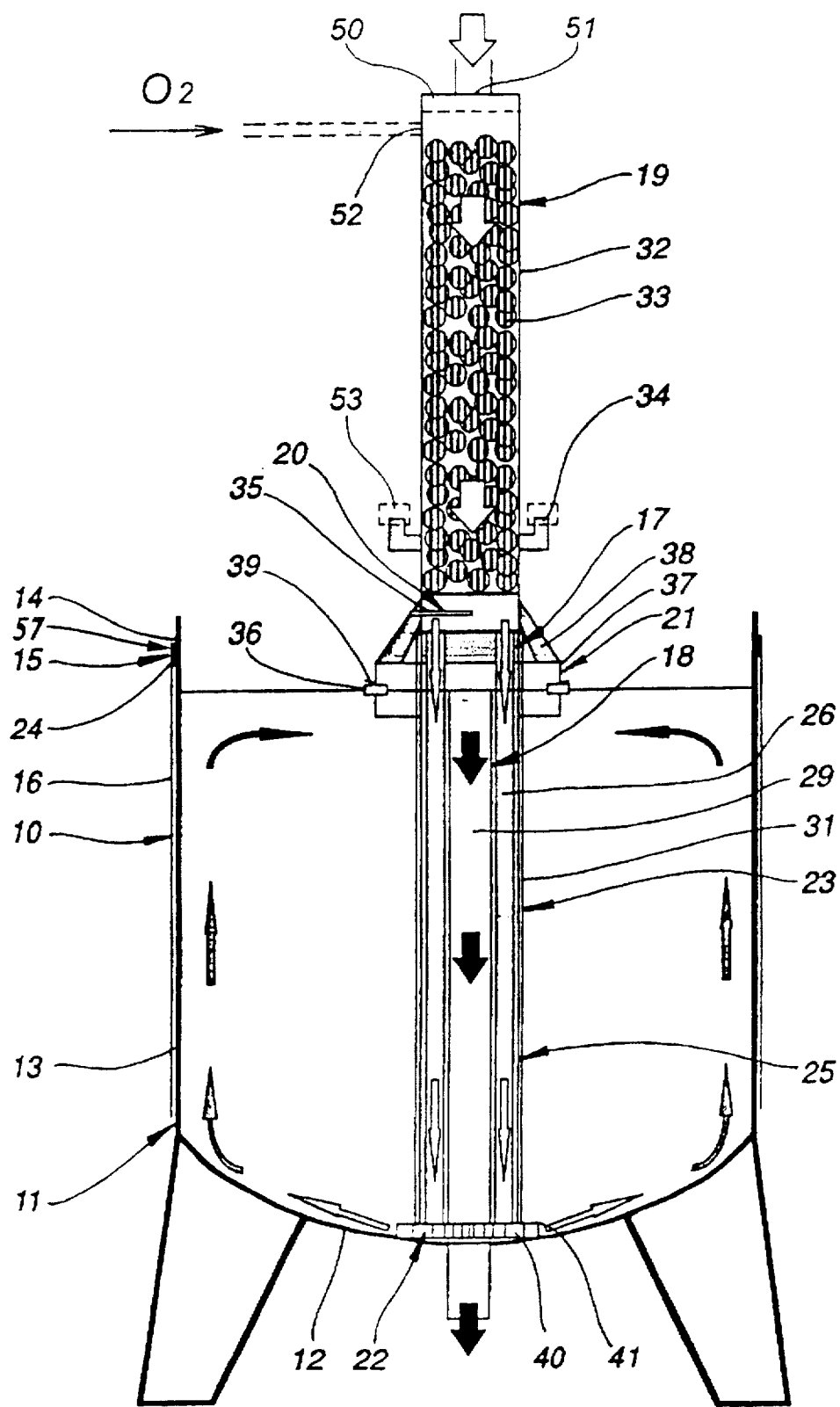
FIG. 1 is a vertical cross-section of the incubator according to the present invention.
Figure 2:
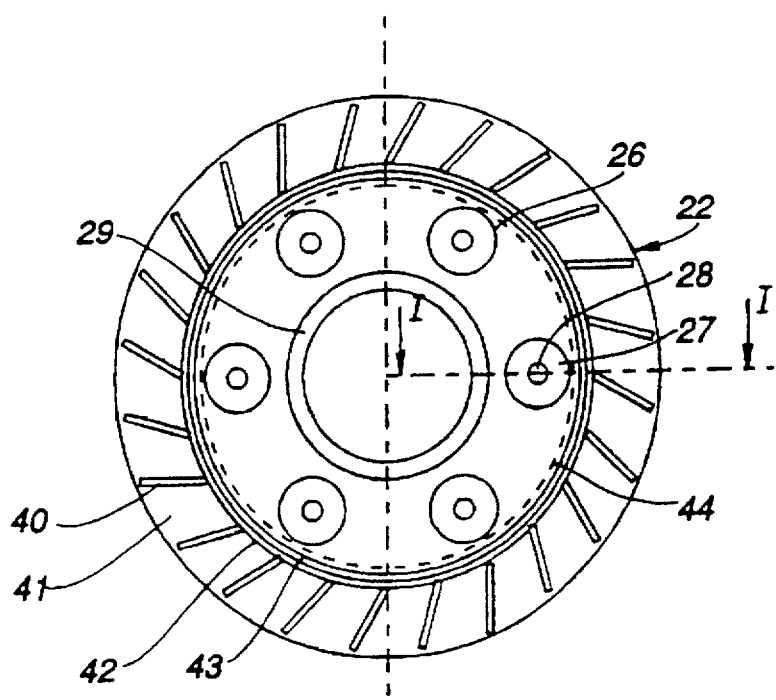
FIG. 2 is a view of the bottom of the element which generates currents in the water of the incubator according to the invention.
Figures 3A, 3B:
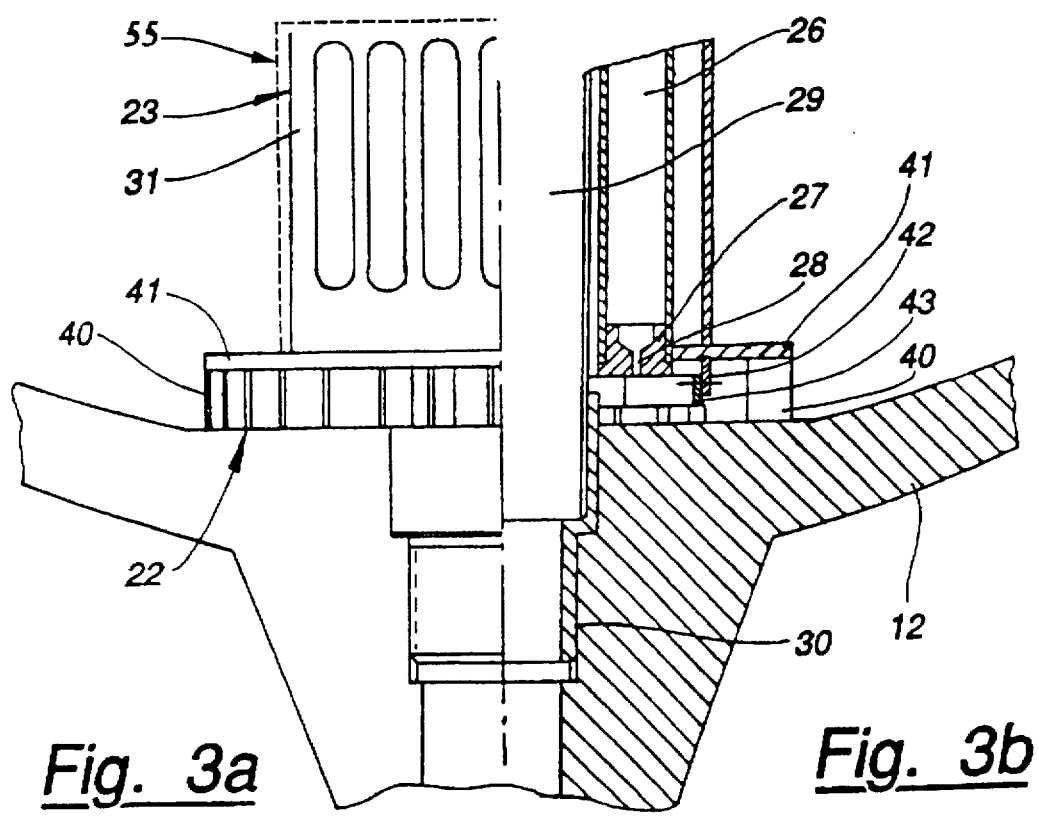
Figure 5:
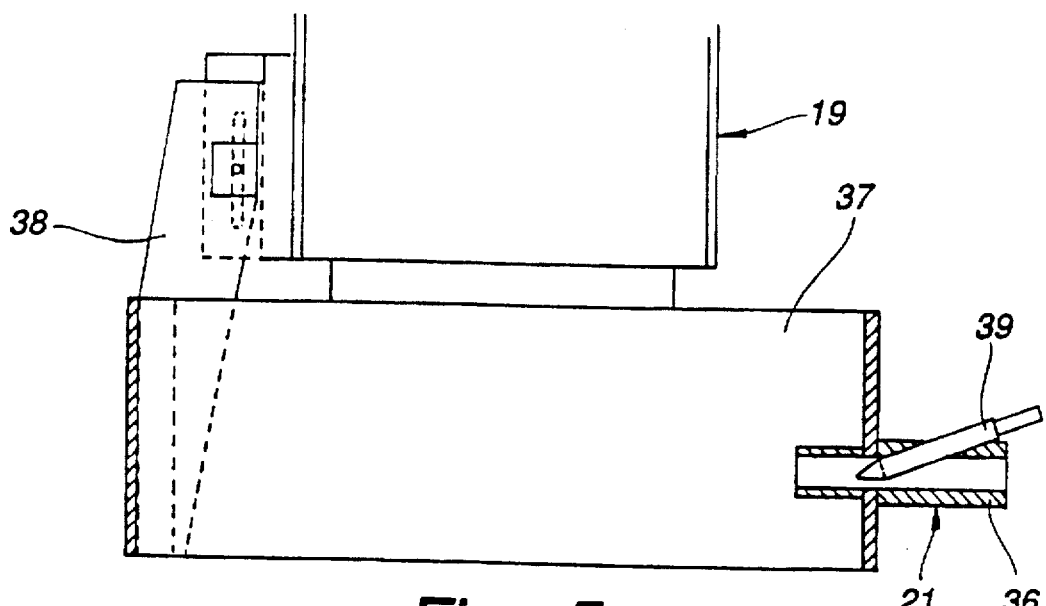
Figure 4:
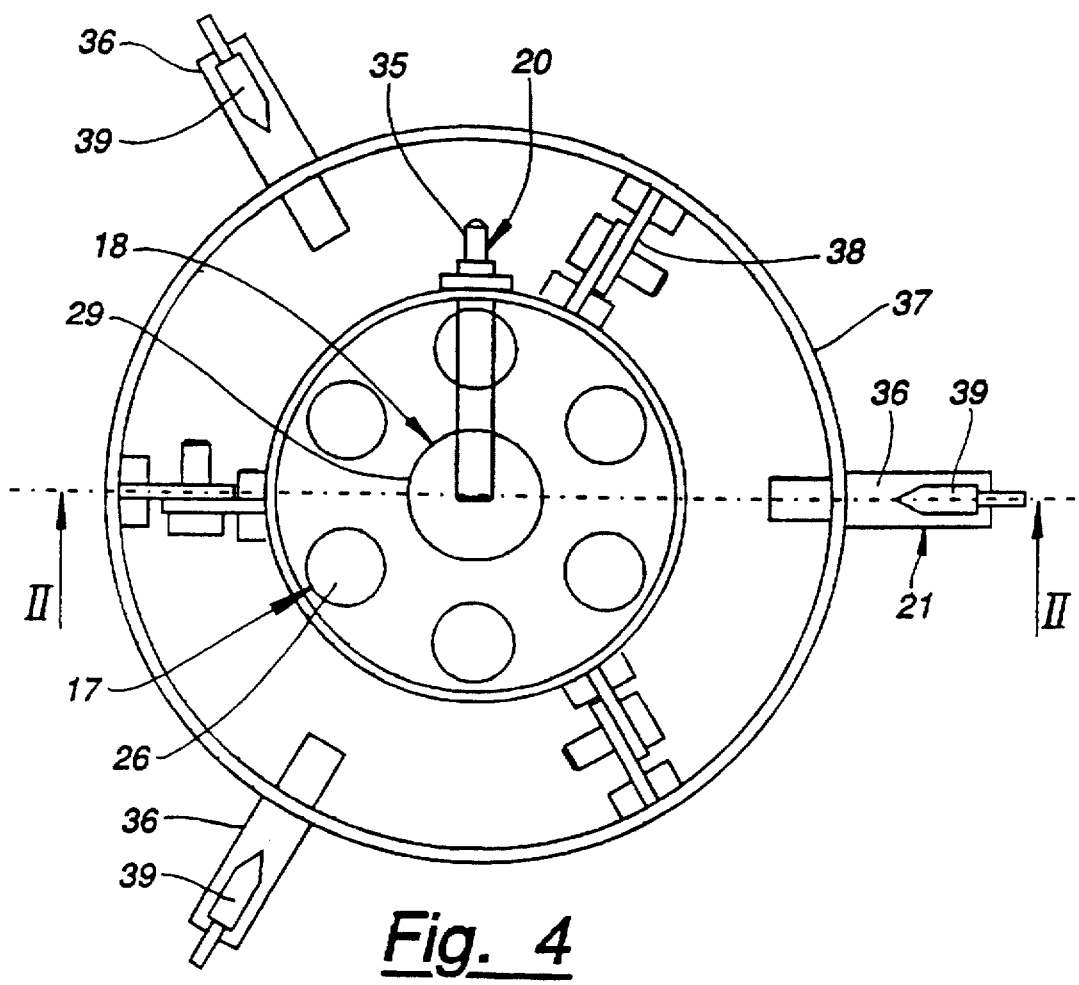

FIGS. 3a and 3b, respectively, are partial views, in cross-section, taken along line I—I of the element of FIG. 2 when attached inside the incubator;

FIG. 4 is an overhead view of the unit formed by the skimming device and the feed dispenser;

FIG. 5 is a cross-section taken along line II—II of the unit shown in FIG. 4.

With reference to the drawings, the larval incubator 10 comprises a cylindrical tank 11 with a base 12 and a lateral wall 13. Tank 11 has a means 17 for supplying clean or regenerated water, a means 18 for evacuating waste water, a device 19 for altering the gas level to either avoid supersaturation of gas or to cause supersaturation of oxygen in the water; a device 20 for distributing feed to the larvae, and a device 21 for skimming the water surface. It is further provided with an element 22 at the base of tank 11 for generating currents in the water inside the tank and with a strainer 23, the function of which will be detailed below.

The means 17 for supplying clean or regenerated water to tank 11 are a duct 25 which may be formed of six regularly spaced tubes 26. These tubes are arranged vertically so that one end is located above the free surface of the water in the tank, near the gas level modification device 19, and the other end empties above current generating element 22. Each tube also has a removable nozzle 27 at this extremity (FIG. 3b), with an opening 28. The dimension of outlet 28 of nozzle 27 determines the rate at which water flows into the tank, and thus the rate can be modified by merely changing nozzles. This is generally done at the beginning of the larva culture and depends upon the type of larva and the tank size.

The means 18 for evacuating waste water consists of an evacuation tube 29 located in the center of tubes 26 and parallel to them. The upper end of evacuation tube 29 is placed sightly below the level of the free surface of the water so as to create a slight depression and suction water from the tank. The lower end passes through the base 12 of the tank and is connected to an evacuation duct (not shown). This end also has a threaded portion 30 (FIG. 3b) so the tube can be screwed into a suitable opening in the base 12 of the tank. Evacuation tube 29 may be glued or soldered to tubes 26, or the unit may be molded as one piece.

Element 22 for generating currents in the water in tank 11 is shaped like a disk 41. On the upper surface, the disk has a circular groove 44 and on the lower surface it has two crowns 42, 43, respectively, which are concentric and interlocking. Crown 42 is permanently attached to disk 41 and crown 43 is designed to slide inside crown 42. For this purpose it has oblong openings for screws for attaching it to fixed crown 42. Thus, the total height of the two crowns can be adjusted at will. Some blades 40, disposed regularly around the two crowns, are taller than the maximum height of the crowns. Blades 40 may be plane and rectangular, and may form a constant angle with a radius passing through an identical point on each blade. They are either glued or soldered to disk 41. They may also be made as one unit by molding the disk and the blades simultaneously. When element 22 is in place, the base of blades 40 rests on base 12 of the tank. Openings 28 in tubes 26 empty into disk 41 in the space defined by crowns 42, 43, while the water flowing from these tubes passes under the crowns and is churned in circles by blades 40. Since the flow of water is constant, the height of the free passage between the base of the tank and crowns 42, 43 determines the speed of the currents in the tank. Thus, regulating the position of slidable crown 43 controls this speed, so it can be adapted to the requirements of the larvae being raised. In addition, the convex base of the tank causes the water to move in a helicoidal, ascending current within the tank. This type of current is beneficial for several reasons. First, it forces waste material in the water to the surface, where evacuation tube 29 can suction it off, and the food particles, which tend to form a sediment on the tank bottom, are again placed in suspension in the water, thereby economizing on feed. Furthermore, it homogenizes the plankton feed mixture, providing all the larvae with an equal amount of nourishment and yielding a uniformly sized batch of larvae. Finally, while a large quantity of water is renewed, the water current is not so rapid as to cause vertebral deformities in the larvae. Modifying the shape of the blades makes it possible to maximize their output.

Strainer 23, which prevents the larvae from entering the water supply/evacuation system, is formed of a perforated cylindrical sleeve 31 (FIG. 3a) covered with a netting 55 that has openings large enough for particles which should be eliminated along with the waste water. This strainer surrounds the unit formed of tubes 26 and evacuation tube 29. Sleeve 31 is positioned on element 22 in groove 44 provided for this purpose and extends above the water surface.

Gas level modification device 19, known in the art, consists of a tube 32 with a synthetic substrate 33 which has a broad surface favoring the exchange of gas between air and water. The substrate may consist of shafts or balls known commercially as "Bioballe"®. The balls have many holes and a broad surface, which allows for a high rate of gas exchange between the air and the water. Two openings 34 in the bottom of tube 32 allow the gases in the water, which are extracted through the substrate, to escape. Tube 32 can be blocked with a removable cover 50 comprising an opening 51, through which water can be introduced, and an opening 52 for oxygen. In addition, openings 34 can be blocked with removable stoppers 53. This gas modification device has two distinct functions. When the removable cover is removed and openings 34 are free, the passage of water through substrate 33 prevents a supersaturation of gas in the water, which is harmful to the larvae. When removable cover 50 blocks tube 32, if oxygen is introduced in the tube and the openings are closed, this device increases the level of oxygen in the water to the point of supersaturation. This embodiment is particularly advantageous, because a large number of larvae can be raised in the same volume of water. Device 19 is screwed onto evacuation tube 29.

Feed distribution device 20 is formed of a tube 35 connected to a reservoir (not shown) containing plankton. The plankton are in solution in the reservoir and are introduced into the clean or regenerated water according to the requirements of the larvae in the tank, perhaps through a valve with an automatically controlled opening, or by using a peristaltic pump. This device is attached beneath gas modification device 19.

Skimming device 21 "skims" the surface of the water in the tank. A greasy film containing lipids and bacteria frequently forms on the surface and prevents the fishes' air bladders from inflating. The skimming device comprises three suction tubes 36 (FIGS. 4 and 5), generally horizontally disposed on a ring 37. The ring may be attached with three slidable clamps 38 to the gas level modification device 19. The skimming device can float on the water surface and the three clamps 38 can slide freely so the skimming device always remains at the ideal level, even if the level of the water in the tank varies slightly. Each suction tube 36 has a nozzle 39 directed generally toward the center of ring 37. The ring is attached in such a way that the level of the free surface of the water reaches the approximate center of tubes 36. Pressurized air is introduced through nozzles 39, creating a depression and suctioning the particles on the tank surface toward the center of ring 37. These particles are then suctioned by the depression created by evacuation tube 29, which eliminates them.

Upper edge 14 of the tank also has a means 15 for attaching a removable black cover 16. The attachment means 15 may consist of a gripping strip 24 attached to the upper edge 14 of the tank, cooperating with a complementary strip 57 provided on the upper edge of removable cover 16. In this way, the cover can be easily placed around tank 11 or removed from it. Attachment means 15 could also consist of hooks and eyes, or any other known mechanical connecting means.

All the incubator accessories except removable cover 16 are connected to evacuation tube 29, which is screwed into the tank base. This arrangement makes it easy to disassemble the unit when a piece must be changed or cleaned. Strainer 23 is particularly easy to remove by unscrewing gas level modification device 19.

With this incubator, the tank may be either transparent or it may be dark and opaque, as desired. Cover 16 may be removed during the first days of incubating the larvae so light can penetrate the tank walls; after the disorganized swimming pattern disappears, cover 16 may be placed around the tank to help the larvae locate food. It is also possible to regulate both the flow of water into the tank, and the speed of the current. Thus, since the incubator adapts readily to various types of larvae, the larvae can be cultured under optimal conditions, and the system ensures a high rate of success.

I claim:

1. A larval incubator for fish larva culture, comprising:
   a tank (11) for containing water, said tank (11) having a base portion (12) and at least one wall (13);
   a device for supplying water to said tank (11) in a helicoidal ascending current pattern, said water supply device having a duct (25) located generally along a vertical axis of said tank (11); said duct comprising at least one inlet tube (26), for transporting clean or regenerated water, connected at a first end to a water supply and at a second end to at least one evacuation outlet (28), said at least one evacuation outlet (28) emptying said water at a location proximal to a rotatable current generating member (22) for directing supply water in said helicoidal ascending current pattern;

a device (18) for evacuating waste water, wherein said waste water is removed from said tank (11) through an evacuation tube (29) in communication with said water contained within said tank (11);

a device (20) for distributing food being in communication with said tank (11), wherein a predetermined amount of food is supplied to said water;

a device (21) for skimming a surface of said water in said tank (11), said skimming device (21) being located proximal to a surface of said water, such that upon activation of said skimming device (21) unwanted matter is removed from said surface of said water; and, a device (19) for controlling a gas level in said water, mounted in communication with said water supply device.

2. The incubator according to claim 1, wherein said member (22) for directing said water in said helicoidal ascending current pattern is comprised of a collection of blades (40) positioned in a predetermined configuration.

3. The incubator according to claim 2, wherein said blades (40) are arranged around a circular crown (42, 43) of adjustable height.

4. The incubator according to claim 1, wherein said duct (25) further comprises a plurality of inlet tubes (26), said plurality of inlet tubes (26) being arranged around said evacuation tube (29) and connected to said evacuation tube (29).

5. The incubator according to claim 4, wherein each of said plurality of inlet tubes (26) further comprises a removable nozzle (27), said nozzle forming said at least one evacuation outlet (28).

6. The incubator according to claim 1, wherein said evacuation tube (29) has a first end located proximal to a level of a free surface of said water in said tank (11), and a second end which passes through said base (12) of said tank (11) and terminates exterior to said tank (11).

7. The incubator according to claim 6, wherein the evacuation tube (29) is removably attached by a threaded connection to said base (12) of said tank (11).

8. The incubator according to claim 4, wherein said plurality of inlet tubes (26), evacuation tube (29), member (22) for directing said water in said helicoidal ascending current pattern, gas level modification device (19), skimming device (21) and food distribution device (20), are all interconnected and form a removable unit.

9. The incubator according to claim 4, wherein said plurality of inlet tubes (26) and said evaculation tube (29) are surrounded by a strainer (23), an upper portion of which is located above said water level.

10. The incubator according to claim 1, wherein said at least one wall (13) is transparent.

11. The incubator according to claim 1, wherein said tank (11) comprises a base (12) which has a relatively low light reflectivity level and is opaque.

12. The incubator according to claim 1, wherein said base (12) is convex.

13. The incubator according to claim 1, wherein an upper edge (14) of said tank (11) has means (15) for attaching a removable cover (16) which has a relatively low light reflectivity level and is opaque.

* * * * *

UNITED STATES PATENT AND TRADEMARK OFFICE
CERTIFICATE OF CORRECTION

PATENT NO. : 5,791,290
DATED : August 11, 1998
INVENTOR(S) : Olivier MUELLER

It is certified that error appears in the above-identified patent and that said Letters Patent is hereby corrected as shown below:

On the title page, item

"[30] Foreign Application Priority Data
Mar. 9, 1994 [CH] Switzerland.....94/02905"

with

"[30] Foreign Application Priority Data
Mar. 9, 1994 [FR] France.....94/02905"

Signed and Sealed this

Twenty-seventh Day of October, 1998

Attest:

BRUCE LEHMAN

Attesting Officer

Commissioner of Patents and Trademarks